3,036,100
PROCESS FOR THE PREPARATION OF HYDROXY PELARGONIC ACID DERIVATIVES
Robert H. Pfeiffer, Woburn, Mass., and David B. Brandon, South Pasadena, and Ronald Swidler, West Covina, Calif., assignors to W. R. Grace & Co., Cambridge, Mass., a corporation of Connecticut
No Drawing. Filed Oct. 14, 1959, Ser. No. 846,275
7 Claims. (Cl. 260—410.9)

This invention relates to a process for the preparation of omega-hydroxy pelargonic acid and its derivatives from the ozonide of oleic acid and its derivatives. Omega-hydroxy pelargonic acid and its esters especially methyl omega-hydroxy pelargonate, the methyl ester of hydroxy pelargonic acid which has the formula

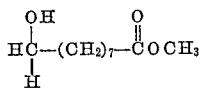

are valuable starting materials in the preparation of high molecular weight polyesters, in the synthesis of amino acids, and in the synthesis of longer chain acids, both monobasic and dibasic.

We have discovered a process wherein omega-hydroxy pelargonic acid and its esters may be produced in yields as high as about 79.5% of the theoretical amount obtainable from the ozonide of oleic acid and its esters. One of the novel features of this process is the fact that the product is produced in a state wherein it is substantially free of the corresponding aldehydooctanoate, the usual by-product of the reductive decomposition of the ozonide of oleic acid and its esters. It is known in the art that this aldehyde, when present, is quite difficult to separate and could interfere with the synthesis of other products from the omega-hydroxy pelargonate. For example, the aldehyde would act as a chain stopper when the hydroxy acid is condensed to a high molecular weight polyester.

From a practical standpoint our process is a continuous process because it is not necessary to isolate the intermediates. Thermodynamically and chemically, however, it consists of two stages. The first stage comprises hydrogenating the ozonide of methyl oleate, at room temperature, in the presence of Raney nickel with an atmosphere of hydrogen at a pressure of 200 to 3000 pounds per square inch. This stage of the process is exothermic and a rise in temperature will be noted. The second stage of the reaction comprises heating the reaction mixture which results from the first stage to a temperature between 62° C. and 150° C.

The concept which underlines this process is believed to be as follows:

The ozonide of methyl oleate, when hydrogenated under the conditions set forth above, decomposes and generates several products i.e. nonanal, nonanol, methyl aldehydooctanoate, methyl omega-hydroxy pelargonate and a polymeric residue. It is not known whether the methyl hydroxy pelargonate which is initially produced in this stage comes directly from the ozonide or through the intermediate form of methyl aldehydooctanoate. The residue which is produced, however, is thought to be a mixture, the ingredients of which are aldehydooctanoate in the trimerized, polymerized or acetal state, but polymeric peroxides might also be present. The first stage of the process is exothermic in its overall nature, and the heat which is generated to some degree facilitates the conversion of part of the methyl aldehydooctanoate and part of the residue, heretofore described, into methyl hydroxy pelargonate. This conversion is endothermic in nature and external heat is added in the second stage of the process in order to bring the conversion to substantial completion.

As stated previously, the first stage of the reaction comprises hydrogenating the ozonide of methyl oleate at room temperature with an atmosphere of hydrogen at a pressure of 200 to 3000 pounds per square inch. In all our experiments except one, the Raney nickel catalyst was present in large excess i.e. 20 to 25 percent by weight based on the weight of methyl oleate used in the experiment. In each case a temperature rise was noted in this stage which reached a peak in 4 to 9 minutes. This temperature rise was between 4° C. to 25° C. depending upon the amount of methyl oleate used and the catalyst concentration.

It was found that only traces of the methyl hydroxy pelargonate were produced by the first stage of the process (i.e. without external heating) when the pressure was 20 pounds per square inch or less. This was the case even though the duration of this stage was 240 minutes in length. The main product obtained was methyl aldehydooctanoate and this was present at about 28.8% of theory. The amount of hydroxy pelargonate produced by the first stage of the reaction increased to about 36.4% of the amount theoretically obtainable from the ozonide of methyl oleate when the pressure of the first stage was increased to around 1000 pounds per square inch. The duration of this stage was 90 minutes. The product yield of methyl aldehydooctanoate obtained by this stage was 16.2% of theory and this was accompanied by 31.9 grams of residue.

It is apparent from the foregoing that methyl aldehydooctanoate is always present in the product yields when only the first stage of the process is used. In a majority of cases, however, upon heating the reaction mixture which resulted from the first stage of the process to between 60° C. to 150° C., it was found that methyl aldehydooctanoate was not detectable in the product yield. In the exceptional case, only traces of the aldehyde could be found when the second stage of the process was used. For instance, in some cases, the temperature of the system was raised to between 60° C. and 85° C. and then the reaction mixture was allowed to cool at which time the product yields were determined. The amount of hydroxy ester obtained was consistently between 75.9% and 79.5% of the amount theoretically obtainable from the ozonide of methyl oleate with the one exceptional case having a product yield of about 64.2%. The amount of residue obtained in all these cases was between 11.1% and 14.8% based on the weight of methyl oleate used. These results indicate that the aldehydooctanoate and part of the residue initially produced by the first stage of the process were converted to the hydroxy pelargonate due to the more rigorous conditions applied in the second stage of the process.

In other cases, the temperature of the second stage was raised to between 85° C. and 126° C. before the reaction mixture was allowed to cool. In all these cases aldehydooctanoate was not detectable in the final products but this time the yields of hydroxy pelargonate obtained were progressively lower than that heretofore obtained when the temperature of the second stage was between 60° C. and 85° C. The yields of methyl hydroxy pelargonate in these cases was between 59% and 78.5%. It was also of interest to note that the residues obtained in these cases were between 14.7% and 23% by weight based on the amount of methyl oleate used. This latter factor indicated that the aldehydooctanoate produced in the first stage of the process underwent a side reaction in the second stage which produced a higher amount of residue in these cases. This theory is further evidenced by the fact that when the temperature of the second stage was increased to 150° C. or above, the amount of residue was increased to about 32% by weight with a corresponding decrease in the amount of methyl hydroxy pelargonate produced to about 41.4% of theory.

The following examples are by way of illustration of the preferred embodiment of the present process.

*Example 1*

100 grams of distilled methyl oleate were dissolved in half as many grams (50) of a naphtha fraction having a boiling range of about 155° C. to 175° C. An oxygen stream containing 2 to 3% ozone, as generated by a standard Welsbach ozonator, was passed through the above solution. The ozonization was determined to be substantially complete by measuring the ozone concentration of the exit gas with indigo disulfonic acid as an indicator.

The ozonized solution was then placed in an autoclave having a stainless steel liner and subsequently 100 ml. of ethyl alcohol and 20 percent by weight of a Raney nickel catalyst, based on the weight of the methyl oleate, was added thereto. A conventional rocking autoclave was used, the liner of which had a volume of 3620 ml. The temperature of the reaction mixture after this addition was about 19° C. The autoclave was then closed and nitrogen was swept therethrough for 2 minutes in order to remove any free oxygen present therein. Subsequently hydrogen was passed through the autoclave, the outlet valves were closed and the pressure in the autoclave was allowed to build up to 1000 pounds per square inch. The temperature of the reaction mixture was found to have risen to about 25.5° C. during the addition of hydrogen. This rise in temperature was thought to be due to the absorption of hydrogen by the Raney nickel catalyst. The autoclave was kept standing under pressure for about 10 minutes in order to permit the detection of major leaks. During this time the temperature dropped to its initial value of 19° C.

During the initial rocking of the autoclave a temperature rise was found to occur which reached a peak at 25.5° C. in about 8 minutes. After this the temperature was found to drop slowly until a temperature of 20.5° C. was reached in 67 minutes. The rocking of the autoclave was stopped and the pressure was released by damping the valves in water.

The reaction mixture was then rinsed out of the autoclave with about 100 cc. of ethyl alcohol and the catalyst was removed therefrom by filtration. The filtrate was then vacuum distilled at a temperature below about 50° C. and under a vacuum of between about 5 to 50 mm. of mercury in order to remove the kerosene, ethyl alcohol, nonanal and nonanol which were present. The residual fluid remaining in the distillation flask was a slightly greenish oil which was distilled at a temperature above about 105° C. under a vacuum in the order of 0.006 to 0.010 mm. of mercury in order to recover the methyl hydroxy pelargonate and the methyl aldehydooctanoate. It was found that the main portion of these materials distilled very fast and at a close boiling range of between 100° C. to 107° C. The next portion distilled slowly at a temperature of between about 108° C. to 109° C. and the remaining portion distilled very slowly above 111° C. leaving a dark brown oily residue in the flask at the end of the distillation. A number of fractions were taken during the distillation and each was tested qualitatively for the presence of aldehydooctanoate by means of fuchsin solution. When the qualitative test proved to be negative the refractive index and the infra red spectrum of the sample were taken to ascertain the purity of the methyl hydroxy pelargonate present in the fraction. When the qualitative test proved to be positive, a quantitative determination was made to ascertain the exact amount of methyl aldehydooctanoate present in the fraction. The quantitative test consisted in mixing the positive fraction with 50 ml. of hydroxyl amine hydrochloride and then after a 30 minute period the sample was titrated with 1 N NaOH until the color of the solution matched a control blank. In this example, the total amount of methyl hydroxy pelargonate obtained by this procedure was found to be 24.9 grams, the amount of methyl aldehydooctanoate was found to be 6.1, and the residue was 27 grams.

*Example 2*

75 grams of methyl oleate were ozonized and hydrogenated employing the procedure set forth in Example 1. The initial temperature of the reactants rose from 26° C. to 27° C. occasioned by the introduction of hydrogen into the autoclave, the hydrogen being allowed to build up therein to a pressure of 20 pounds per square inch. Within 17 minutes of the initial rocking of the autoclave, however, the temperature of the reactants rose to a peak of 52° C. but within 148 minutes thereafter it gradually cooled to 27° C. The pressure which was found to have dropped to 13.8 pounds per square inch within 45 minutes of the initial rocking of the autoclave was brought again to 20 pounds per square inch. The autoclave was stopped after a total rocking time of 240 minutes and the contents thereof were distilled and tested in the manner set forth in Example 1. The yields obtained were 22.8 grams of methyl aldehydooctanoate and 20.0 grams of residue. It was also noted that very slight traces of methyl hydroxy pelargonate were present in these products.

*Example 3*

100 grams of methyl oleate were ozonized and hydrogenated employing the procedure set forth in Example 1. The initial temperature of the reactants rose from 18° C. to 25° C. in 7 minutes occasioned by the introduction of hydrogen into the autoclave, the hydrogen being allowed to build up therein to a pressure of about 1040 pounds per square inch. The temperature of the reactants was allowed to cool to 21° C. before the autoclave was rocked and this took about 5 minutes. Within 9 minutes of the initial rocking of the autoclave, however, the temperature of the reactants rose to a peak of 23.5° C., but this gradually cooled to 19.5° C. in 81 minutes. The rocking of the autoclave was then stopped and the contents thereof were distilled and tested in the same manner set forth in Example 1. The yields obtained were 23 grams of methyl hydroxy pelargonate, 10.2 of methyl aldehydooctanoate, and 31.9 grams of residue.

*Example 4*

100 grams of methyl oleate were ozonized and hydrogenated employing the procedure set forth in Example 1. The initial temperature of the reactants rose from 19° C. to 27° C. in 7 minutes occasioned by the introduction of hydrogen into the autoclave, the hydrogen being allowed to build up therein to a pressure of about 1080 pounds per square inch. The temperature of the reactants was allowed to cool to 23° C. before the autoclave was rocked and this took about 10 minutes. Within 8 minutes of the initial rocking of the autoclave, however the temperature of the reactants rose to a peak of 27.0° C. but within 52 minutes thereafter it gradually cooled to 23.5° C. The system was then heated, the temperature of the reactants reaching a peak at 72° C. in about 55 minutes at which time the system was allowed to cool, the temperature of the reactants gradually decreasing to 60° C. in 100 minutes. The rocking of the autoclave was then stopped after which the contents thereof were distilled and tested in the same manner set forth in Example 1, but the presence of aldehydes was not detected. The yields obtained were 50.4 grams of methyl hydroxy pelargonate, and 14.5 grams of residue.

*Example 5*

200 grams of methyl oleate were ozonized and hydrogenated in a manner similar to that of Example 1. The amount of Raney nickel used in this case was about 25 percent based on the weight of methyl oleate which had been used. The initial temperature rose from 18° C. to 26° C. in 5 minutes occasioned by the introduction of hydrogen into the autoclave, the hydrogen being allowed to build up therein to a pressure of about 1070 pounds per square inch. The reactants were then allowed to cool to 23° C. before the autoclave was rocked and this took about 8 minutes. Within 4 minutes of the initial rocking of the autoclave, the temperature rose to about 45° C. after which it gradually decreased to about 27.0° C. in about 23 minutes. Heat was then applied to the system, the temperature rising to 81° C. in about 40 minutes after which it was allowed to cool to 70° C. in about 110 minutes. The pressure at this point was 890 pounds per square inch. The rocking of the autoclave was stopped after a total rocking time of about 177 minutes and the reaction mixture was distilled and tested as set forth in Example 1, no aldehydes being detected. The yields obtained were 98.2 grams of methyl hydroxy pelargonate and 22.1 grams of residue.

*Example 6*

200 grams of methyl oleate were ozonized and hydrogenated in a manner similar to that of Example 1. The amount of Raney nickel used in this case was about 25 percent based on the weight of methyl oleate which had been used. The initial temperature rose from 17° C. to 21.5° C. in 11 minutes occasioned by the introduction of hydrogen into the autoclave, the hydrogen being allowed to build up therein to a pressure of 1070 pounds per square inch. Within 3 minutes of the initial rocking of the autoclave, the temperature rose to about 41° C. after which it gradually decreased to 24° C. in about 72 minutes. Heat was then applied to the system, the temperature rising to 60° C. in about 30 minutes after which it was allowed to cool to 40° C. in about 40 minutes. The rocking of the autoclave was stopped after a total rocking time of about 155 minutes and the reaction mixture was distilled and tested as set forth in Example 1, no aldehydes being detected. The yields obtained were 98.2 grams of methyl hydroxy pelargonate and 35.1 grams of residue.

*Example 7*

100 grams of methyl oleate were ozonized and hydrogenated employing the procedure set forth in Example 1. The initial temperature of the reactants rose from 18° C. to 25° C. in 7 minutes occasioned by the introduction of hydrogen into the autoclave, the hydrogen being allowed to build up therein to a pressure of 900 pounds per square inch. The temperature of the reactants was allowed to cool to 21° C. before the autoclave was rocked and this took about 3 minutes. Within 7 minutes of the initial rocking of the autoclave, however, the temperature of the reactants rose to a peak of 28.5° C. but within 58 minutes thereafter it gradually cooled to 22° C. The system was then heated, the temperature of the reactants reaching a peak at 62° C. in about 22 minutes at which time the system was allowed to cool, the temperature of the reactants gradually decreasing to 46° C. in 35 minutes. The rocking of the autoclave was then stopped after a total rocking time of 130 minutes and the contents thereof were distilled and tested as set forth in Example 1, but the presence of aldehydes was not detected. The yields obtained were 49.9 grams of methyl hydroxy pelargonate, and 14.8 grams of residue.

*Example 8*

100 grams of methyl oleate were ozonized and hydrogenated employing the procedure set forth in Example 1. The amount of Raney nickel used in this case was about 20 percent based on the weight of methyl oleate which had been used. The initial temperature of the reactants rose from 20° C. to 22° C. occasioned by the introduction of hydrogen into the autoclave, the hydrogen being allowed to build up therein to a pressure of about 1080 pounds per square inch. The temperature of the reactants was allowed to cool to 20° C. before the autoclave was rocked and this took about 5 minutes. Within 10 minutes of the initial rocking of the autoclave, however, the temperature of the reactants rose to a peak of 23.5° C. but within 57 minutes thereafter it gradually cooled to 21° C. The system was then heated, the temperature of the reactants reaching a peak at 64° C. in about 53 minutes at which time the system was allowed to cool, the temperature of the reactants gradually decreasing to 62.5° C. in 15 minutes. The pressure at this point was 1050 pounds per square inch. The rocking of the autoclave was then stopped after a total rocking time of 150 minutes and the contents thereof were distilled and tested in the same manner set forth in Example 1, but the presence of aldehydes was not detected. The yields obtained were 40.7 grams of methyl hydroxy pelargonate, and 14.0 grams of a residue.

*Example 9*

200 grams of methyl oleate were ozonized and hydrogenated employing the procedure set forth in Example 1. The amount of Raney nickel used in this case was about 5 percent based on the weight of methyl oleate which had been used. The initial temperature of the reactants rose from 20° C. to 21° C. occasioned by the introduction of hydrogen into the autoclave, the hydrogen being allowed to build up therein to a pressure of about 1080 pounds per square inch. Within 10 minutes of the initial rocking of the autoclave, the temperature of the reactants rose to 23° C. but within 15 minutes thereafter it gradually cooled to 20° C. The system was then heated, the temperature of the reactants reaching a peak at 36° C. in about 45 minutes at which time the system was allowed to cool, the temperature of the reactants gradually decreasing to 27° C. in 110 minutes. The rocking of the autoclave was stopped after a total rocking time of about 180 minutes and the contents thereof were distilled and tested in the same manner set forth in Example 1. The yields obtained were 37 grams of methyl hydroxy pelargonate and 57 grams of methyl aldehydooctanoate and 44.5 grams of residue.

*Example 10*

75 grams of methyl oleate were ozonized and hydrogenated employing the procedure set forth in Example 1. In this case, however, the hydrogen was introduced into the autoclave only to a pressure of 20.4 pounds per square inch. Within 15 minutes of the initial rocking of the autoclave, the temperature rose from 25° C. to 53° C. but within 25 minutes thereafter it gradually cooled to 40° C. Also, the pressure, which was found to have dropped to 12.5 pounds per square inch within 40 minutes of initial rocking, was brought to 20.2 pounds per square inch. The system was then heated, the temperature of the reactants reaching a peak at 70° C. in about 70 minutes at which time it was noted that the pressure had decreased to 21.2 pounds per square inch. The pressure was brought to 30 pounds per square inch and the system was allowed to cool. The temperature of the reactants gradually decreased to 65° C. which took about 125 minutes at which time it was noted that the pressure had decreased to about 27.2 pounds per square inch. The pressure was again raised to 40 pounds per square inch. The rocking of the autoclave was stopped after a total rocking time of about 300 minutes and the contents thereof were distilled and tested in the same manner set forth in Example 1. The yields obtained were 4.8 grams of methyl aldehydooctanoate, 6.3 grams of methyl hydroxy pelargonate and 24.5 grams of residue.

*Example 11*

150 grams of methyl oleate were ozonized and hydrogenated employing the procedure set forth in Example 1. In this case, however, 100 ml. of methyl alcohol was used as solvent in the hydrogenation stage. The initial temperature of the reactants rose from 19.5° C. to 28° C. in 10 minutes occasioned by the introduction of hydrogen into the autoclave, the hydrogen being allowed to build up therein to a pressure of 1010 pounds per square inch. The temperature of the reactants was allowed to cool to 23.5° C. before the autoclave was rocked and this took about 5 minutes. Within 4 minutes of the initial rocking of the autoclave, however, the temperature of the reactants rose to a peak of 38° C. but within 16 minutes thereafter it gradually cooled to 27.5° C. The pressure at this point was 950 pounds per square inch. The system was then heated, the temperature of the reactants reaching a peak at 126° C. in about 75 minutes at which time the pressure was 1050 pounds per square inch. The system was then allowed to cool and the temperature gradually decreased to 116° C. in 55 minutes. The rocking of the autoclave was then stopped after which the contents thereof were distilled and tested in the same manner set forth in Example 1, but the presence of aldehydes was not detected. The yields obtained were 74.7 grams of methyl hydroxy pelargonate and 22.0 grams of residue.

*Example 12*

250 grams of methyl oleate were ozonized and hydrogenated employing the procedure set forth in Example 1. In this case, however, 200 ml. of methanol were used as solvent in the hydrogenation stage. The initial temperature of the reactants rose from 17° C. to 22.5° C. in 10 minutes occasioned by the introduction of hydrogen into the autoclave, the hydrogen being allowed to build up therein to a pressure of 1030 pounds per square inch. The temperature of the reactants was allowed to cool to 17° C. before the autoclave was rocked and this took about 10 minutes. Within 3 minutes of the initial rocking of the autoclave, however, the temperature of the reactants rose to a peak of 43° C. but within 11 minutes thereafter it gradually cooled to 28° C. At this point the pressure in the system was 950 pounds per square inch. The system was heated, the temperature of the reactants reaching a peak at 150° C. in about 56 minutes. The system was maintained at this temperature for 66 minutes during which time the pressure rose to about 1200 pounds per square inch. The rocking of the autoclave was then stopped after which the contents thereof were distilled and tested in the same manner set forth in Example 1, but the presence of aldehydes was not detected. The yields obtained were 65.5 grams of methyl hydroxy pelargonate and 80 grams of residue.

*Example 13*

250 grams of methyl oleate were ozonized and hydrogenated employing the procedure set forth in Example 1. In this case, however, 150 ml. of methanol were used as solvent in the hydrogenation stage. The initial temperature of the reactants rose from 19.5° C. to 25.5° C. in 9 minutes occasioned by the introduction of hydrogen in the autoclave, the hydrogen being allowed to build up therein to a pressure of about 1090 pounds per square inch. The temperature of the reactants was allowed to cool to 22° C. before the autoclave was rocked and this took about 4 minutes. Within 2 minutes of the initial rocking of the autoclave, however, the temperature of the reactants rose to a peak of 56° C. but within 18 minutes thereafter it gradually cooled to 33° C. The system was then heated, the temperature of the reactants reaching a peak at 88° C. in about 45 minutes at which time the system was allowed to cool, the temperature of the reactants gradually decreasing to 62° C. in about 163 minutes. The pressure at this point was about 890 pounds per square inch. The rocking of the autoclave was then stopped after which the contents thereof were distilled and tested as set forth in Example 1, but the presence of aldehydes was not detected. The yields obtained were 105 grams of methyl hydroxy pelargonate and 39 grams of residue.

*Example 14*

300 grams of methyl oleate were ozonized and hydrogenated employing the procedure set forth in Example 1. The initial temperature of the reactants rose from 15° C. to 23° C. in about 11 minutes occasioned by the introduction of hydrogen into the autoclave, the hydrogen being allowed to build up therein to a pressure of about 1040 pounds per square inch. The temperature of the reactants was allowed to cool to 22° C. before the autoclave was rocked and this took about 4 minutes. Within 7 minutes of the initial rocking of the autoclave, however, the temperature of the reactants rose to a peak of 58° C. but within 18 minutes thereafter it gradually cooled to 49° C. The system was then heated, the temperature of the reactants reaching a peak at 95° C. in about 50 minutes at which time the system was allowed to cool, the temperature of the reactants gradually decreasing to 73° C. in 315 minutes. The pressure at this point was found to be 830 pounds per square inch. The rocking of the autoclave was then stopped after which the contents thereof were distilled and tested in the same manner set forth in Example 1, but the presence of aldehydes was not detected. The yields obtained were 113.1 grams of methyl hydroxy pelargonate and 67 grams of residue.

*Example 15*

Twenty parts by weight of oleic acid were dissolved in 80 parts of acid-refined petroleum solvent boiling in the range of about 149° C. to 204° C. commonly known as Stoddard solvent. A stream of ozonized air was passed through the solution until the major part of the said oleic acid was precipitated as the insoluble ozonide while maintaining the solution at a temperature below 50° C. The solid ozonide was separated from the solution on a filter, then dissolved in 100 parts by weight of 95% ethyl alcohol. To the solution in a pressure vessel were added 5 parts of Raney nickel catalyst and hydrogen was then introduced at a pressure of 200 pounds per square inch with agitation allowing the temperature to rise to 100° C. After two hours, when no further hydrogen is absorbed, the pressure was released and the catalyst removed by filtration, taking care to avoid excessive contact with air which may ignite the catalyst. The solution was then separated by distillation into an ethyl alcohol fraction and a nonyl alcohol fraction overhead. The residue was crude omega-hydroxy nonanoic acid. It was purified by dissolving in aqueous sodium hydroxide, filtering through decolorizing carbon, then separating the product as an oil by adding hydrochloric acid.

Although we have described the use of this process in connection with the production of methyl omega-hydroxy pelargonate it may also be used to produce omega-hydroxy acids or higher esters thereof depending on which ozonide is used in the process. For example, if the basic ozonide used is oleic acid the product will be omega-hydroxy pelargonic acid, while if the ozonide of ethyl oleate is used the product will be ethyl omega-hydroxy pelargonate. In general it may be stated that this process may be used to produce omega-hydroxy acids or esters thereof from the ozonide of both mono and poly unsaturated fatty acids or esters thereof, such as oleic, linoleic and linolenic acids which are found abundantly in fats and fatty oils of animal and vegetable origin. A good source of these acids would be the commercial oils such as tall oil, corn oil, soybean oil, etc.

Solvents suitable for use in the ozonization stage of our process are the saturated hydrocarbons such as hexane, octane, kerosene, acid-refined petroleum naphtha, and particularly naphtha fractions of low volatility suffering little loss by evaporation when contracted with large volumes of ozonized air. Hydrocarbons having initial boiling points above about 93° C. are quite suitable. Benzene and other aromatic hydrocarbons can be used as well as saturated chlorinated hydrocarbons, carbon tetrachloride, trichlorethane, etc. In the hydrogenation stage of our process we prefer to add oxygen containing solvents, particularly the alcohols and ethers and their derivatives. Ethanol (95%) is quite suitable and easily eliminated by distillation from the products of reaction. Isopropanol, butyl alcohol, ethylene glycol, ethylene glycol ethers with methyl or ethyl alcohol (Cellosolves), and dioxane are examples of suitable solvents. As stated hereinabove, the same solvent can be used in both the ozonization stage and the hydrogenation stage of the process, except where the ozonide is insoluble as in the case of the ozonide of oleic acid in hydrocarbon solvents. We can also use the nonyl alcohol produced in our process as the solvent, thereby reducing the number of tanks and solvent recovery steps in the process.

We claim:

1. A process for the manufacture of a hydroxy compound selected from the group consisting of omega hydroxy pelargonic acid and lower aliphatic alcoholic esters thereof comprising: catalytically hydrogenating an ozonide selected from the group consisting of ozonides of oleic acid and ozonides of lower aliphatic alcoholic esters of oleic acid in the presence of free hydrogen and Raney nickel at a pressure in the range of 200 to 3000 pounds per square inch, heating the materials so hydrogenated to a temperature in the range of 60° C. to 150° C., and recovering said hydroxy compound from the reaction mixture in yields greater than 59% of theory and substantially free of aldehydic by-products.

2. The process of claim 1 wherein omega hydroxy pelargonic acid is produced from the ozonide of oleic acid.

3. The process of claim 1 wherein lower aliphatic alcoholic esters of omega hydroxy pelargonic acid are produced from lower aliphatic alcoholic esters of oleic acid.

4. The process of claim 1 wherein methyl omega-hydroxy pelargonate is produced from the ozonide of methyl oleate.

5. The process of claim 1 wherein methyl omega-hydroxy pelargonate is produced from the ozonide of methyl oleate at a pressure in the range of 900 to 1100 pounds per square inch.

6. The process of claim 1 wherein the temperature of the heating stage is in the range of 60° C. to 85° C. and methyl omega-hydroxy pelargonate is produced from the ozonide of methyl oleate in yields greater than 75% of theory.

7. The process of claim 5 wherein the temperature of the heating stage is in the range of 60° C. to 85° C. and methyl omega-hydroxy pelargonate is produced from the ozonide of methyl oleate in yields greater than 75% of theory.

References Cited in the file of this patent

UNITED STATES PATENTS 2,862,940     Otuski et al. _____ Dec. 2, 1958

OTHER REFERENCES

Brewster: "Organic Chemistry," 2nd edition, 1953, page 155.